(12) United States Patent
Govindasamy

(10) Patent No.: US 12,218,404 B2
(45) Date of Patent: *Feb. 4, 2025

(54) NETWORK DEVICE MOUNTING

(71) Applicant: Extreme Networks, Inc., San Jose, CA (US)

(72) Inventor: Gururaj Govindasamy, San Ramon, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,560

(22) Filed: Oct. 10, 2023

(65) Prior Publication Data

US 2024/0047848 A1 Feb. 8, 2024

Related U.S. Application Data

(63) Continuation of application No. 17/284,729, filed as application No. PCT/US2019/055748 on Oct. 10, 2019, now Pat. No. 11,876,281.

(60) Provisional application No. 62/744,596, filed on Oct. 11, 2018, provisional application No. 62/744,118, filed on Oct. 10, 2018.

(51) Int. Cl.
| | |
|---|---|
| *H01Q 1/12* | (2006.01) |
| *F16B 5/10* | (2006.01) |
| *F16B 21/02* | (2006.01) |

(52) U.S. Cl.
CPC ............. *H01Q 1/1221* (2013.01); *F16B 5/10* (2013.01); *F16B 21/02* (2013.01)

(58) Field of Classification Search
CPC ......... H01Q 1/12; H01Q 1/1221; F16B 5/10; F16B 21/02
See application file for complete search history.

(56) References Cited

U.S. PATENT DOCUMENTS

| | | | |
|---|---|---|---|
| 5,335,890 | A | 8/1994 | Pryor et al. |
| 9,022,333 | B2 | 5/2015 | Chen et al. |
| D764,064 | S | 8/2016 | Vezina |
| 2006/0211451 | A1 | 9/2006 | Pak |
| 2010/0302127 | A1* | 12/2010 | Frank ................... H01Q 1/1221 248/343 |

(Continued)

FOREIGN PATENT DOCUMENTS

| | | |
|---|---|---|
| CN | 102165352 A | 8/2011 |
| CN | 103249647 A | 8/2013 |

(Continued)

OTHER PUBLICATIONS

Aerohive Networks, "Aerohive AP550 Hardware User Guide", Sep. 14, 2016.

(Continued)

*Primary Examiner* — Hoang V Nguyen
(74) *Attorney, Agent, or Firm* — Sterne, Kessler, Goldstein & Fox P.L.L.C.

(57) ABSTRACT

A mounting device configured to be integrated with a network device to facilitate mounting of the network device is disclosed. In an embodiment, the mounting device is a twist-to-lock mounting device configured to be compatible with one or more standard types of ceiling rails, allowing network devices to be mounted in a non-destructive manner without requiring the use of tools.

20 Claims, 5 Drawing Sheets

(56) References Cited

U.S. PATENT DOCUMENTS

| | | | |
|---|---|---|---|
| 2011/0164854 A1 | 7/2011 | Desard et al. | |
| 2014/0117186 A1* | 5/2014 | Govindasamy | F16M 11/16 248/317 |
| 2021/0296755 A1 | 9/2021 | Govindasamy | |

FOREIGN PATENT DOCUMENTS

| | | |
|---|---|---|
| CN | 203729481 U | 7/2014 |
| CN | 204334610 U | 5/2015 |
| CN | 207382343 U | 5/2018 |

OTHER PUBLICATIONS

Aerohive Networks, "Aerohive AP330 and AP350 User Guide", Oct. 27, 2013.
Extented European Search Report directed to related European Application No. 19870332.4, mailed May 27, 2022; 6 pages.
International Search Report and Written Opinion directed to related International Application No. PCT/US2019/055748, mailed Jan. 24, 2020; 8 pages.
International Preliminary Report on Patentability directed to related International Application No. PCT/US2019/055748, mailed on Apr. 8, 2021; 7 pages.

* cited by examiner

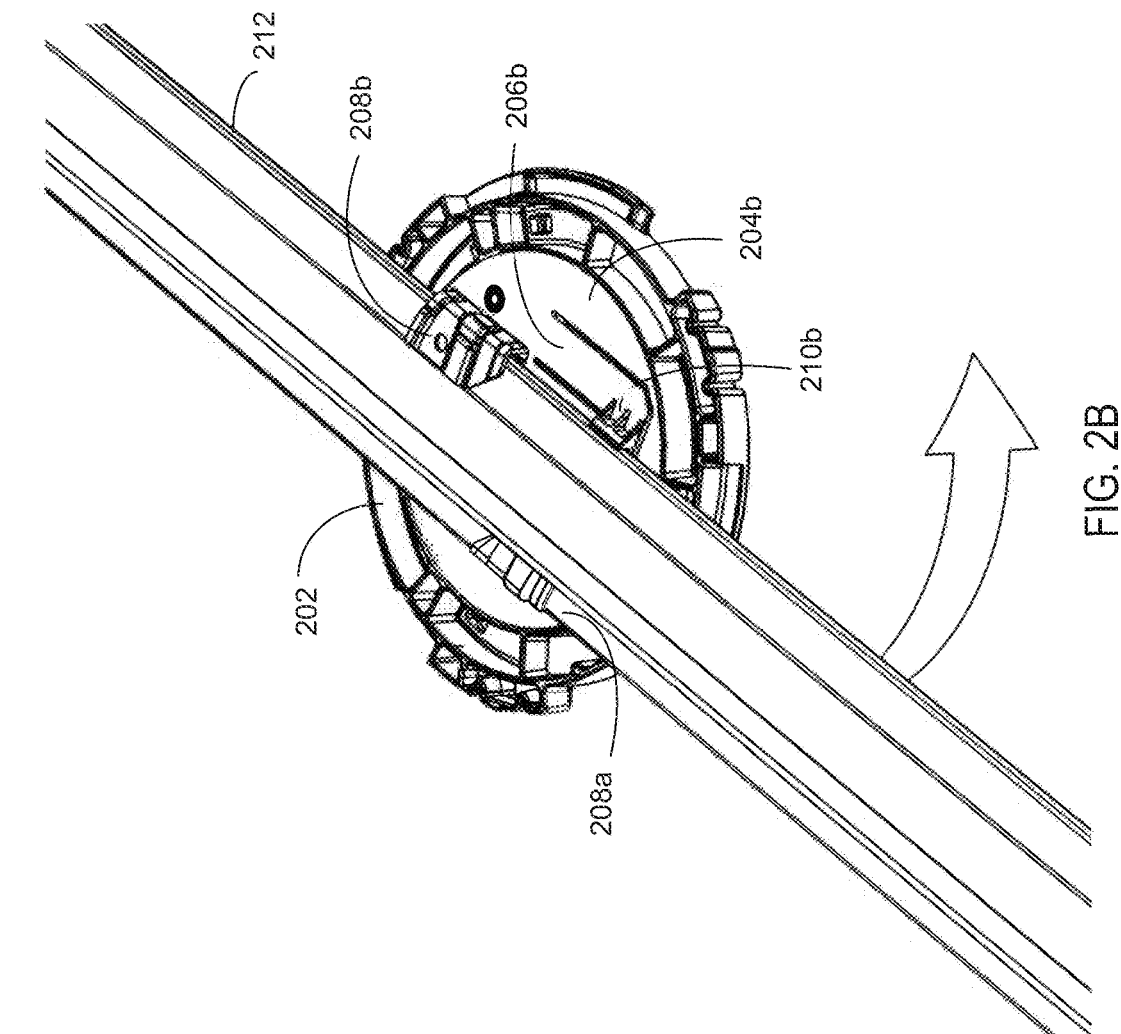
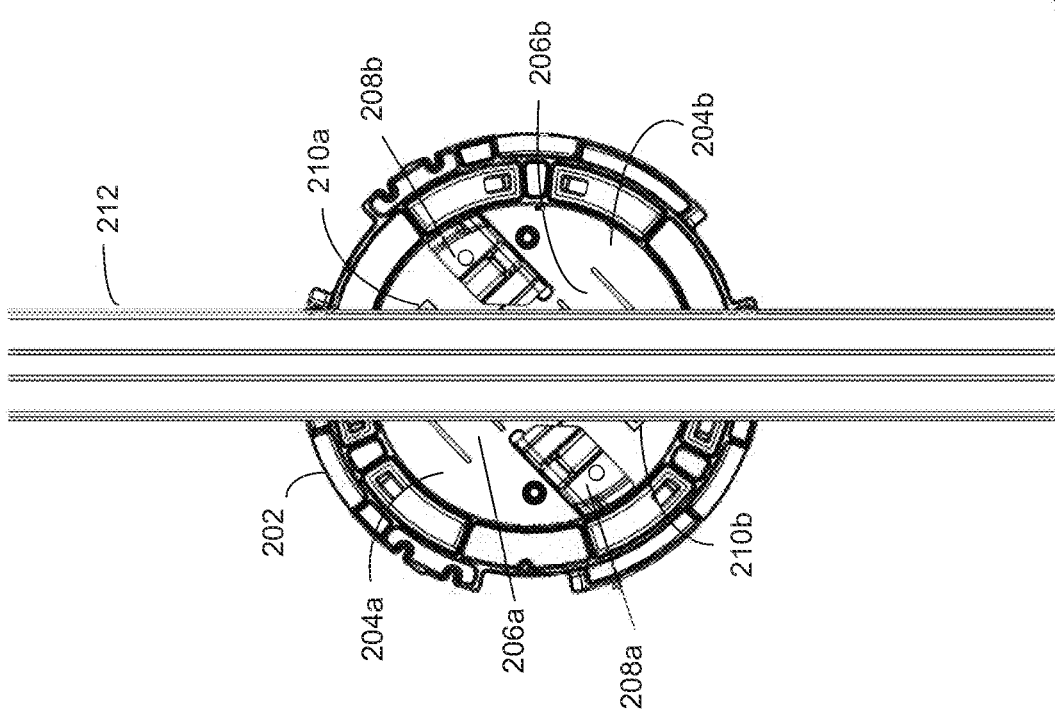
FIG. 2B
FIG. 2A

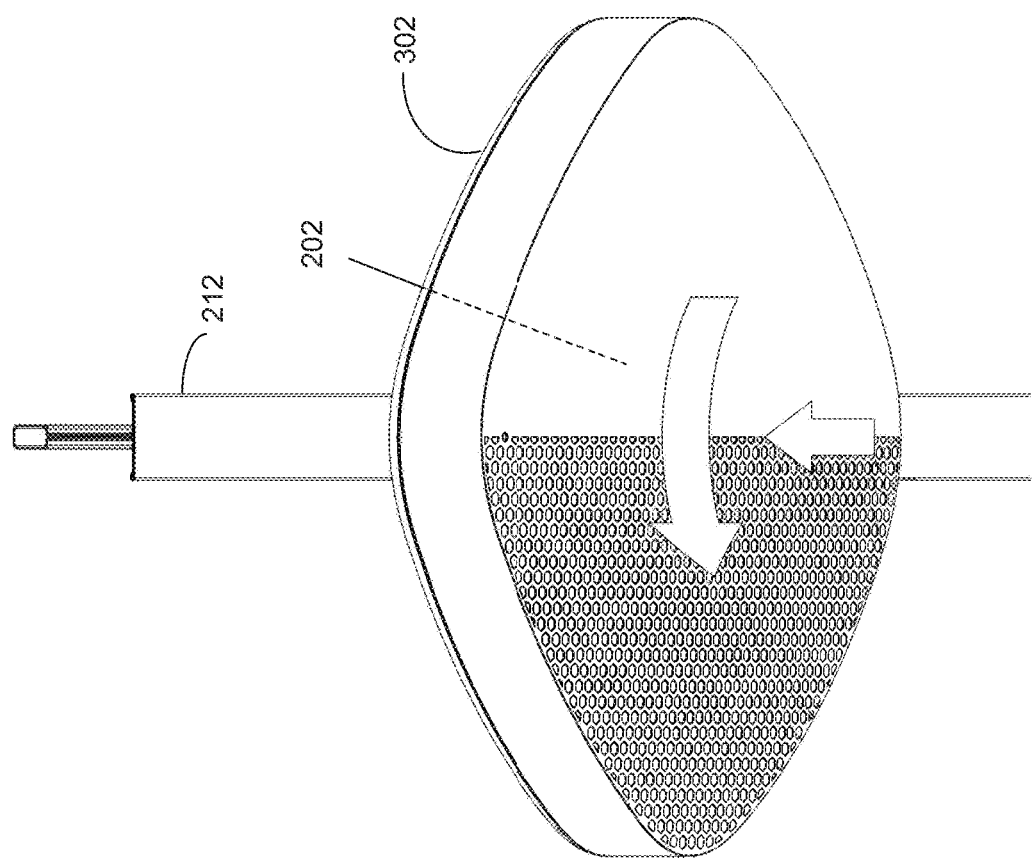
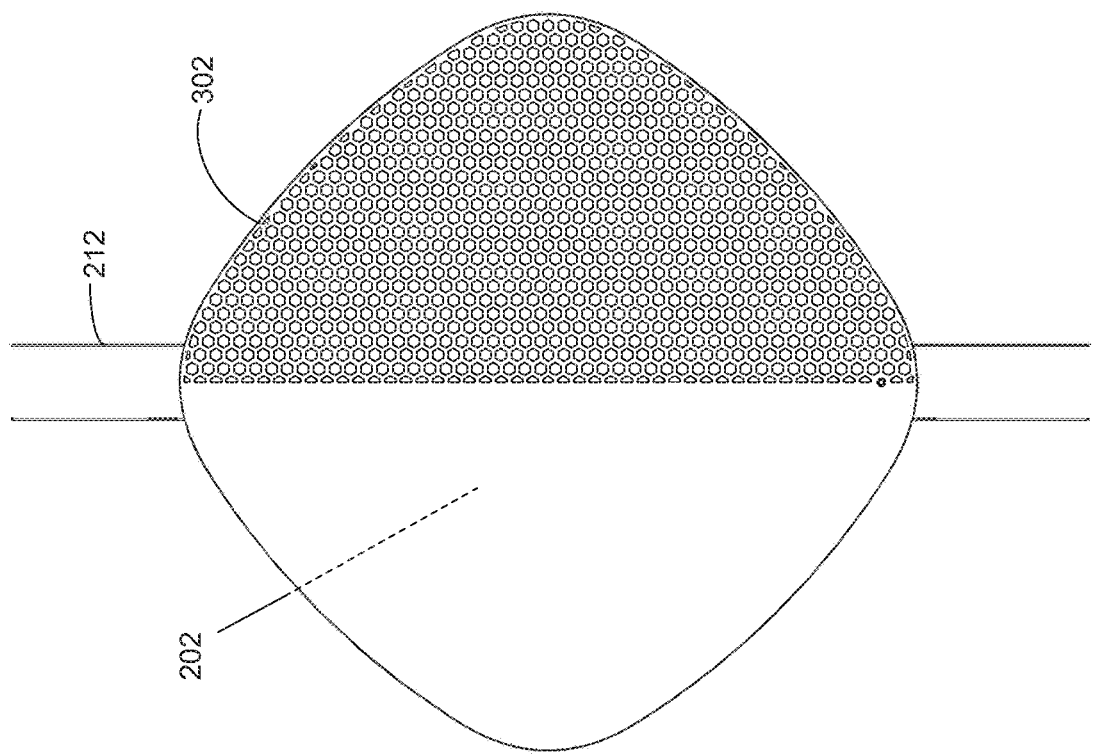

NETWORK DEVICE MOUNTING

CROSS REFERENCE TO RELATED APPLICATIONS

This application is a continuation of U.S. Non-Provisional application Ser. No. 17/284,729, filed on Apr. 12, 2021, which is a National Stage Entry of International Application No. PCT/US19/55748, filed on Oct. 10, 2019, which claims priority from U.S. Provisional Application No. 62/744,596, filed on Oct. 11, 2018 and U.S. Provisional Application No. 62/744,118, filed on Oct. 10, 2018, the contents of each is hereby incorporated by reference in their entireties.

BRIEF DESCRIPTION OF THE DRAWINGS

FIG. 2A and FIG. 2B illustrate attachment of an integrated mounting device to a ceiling rail in an embodiment.

FIG. 4A and FIG. 4B illustrate removal of a network device from an integrated mounting device in an embodiment.

DETAILED DESCRIPTION

Figure 1:
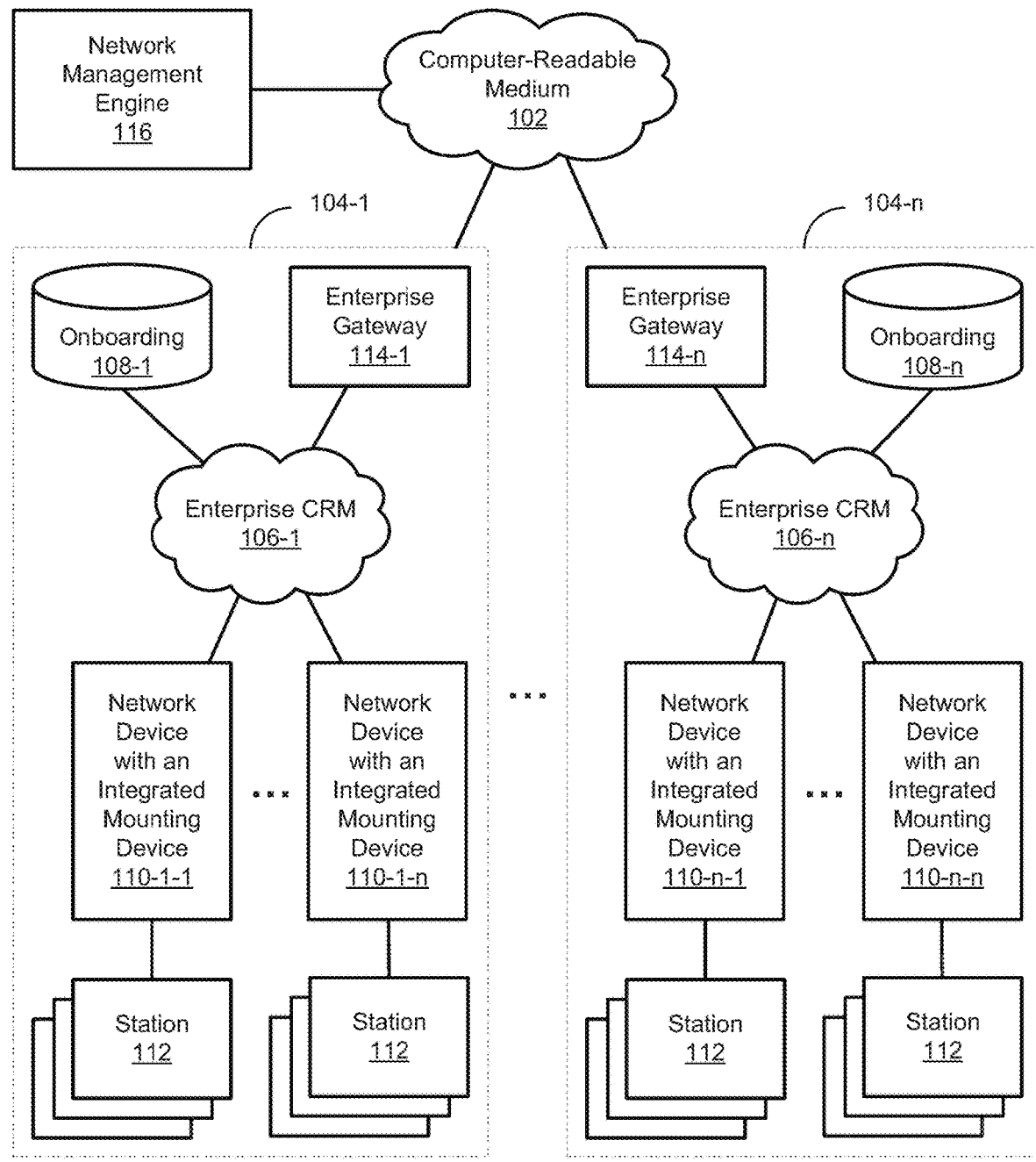
FIG. 1 depicts a diagram of an example of a system for providing a network that includes network devices with integrated mounting devices.

FIG. 1 depicts a diagram 100 of an example of a system for providing a network that includes a network device with an integrated mounting device. The diagram 100 includes a computer-readable medium (CRM) 102, an enterprise network 104-1 to an enterprise network 104-n (collectively, the enterprise networks 104) coupled to the CRM 102, and a network management engine 116 coupled to the CRM 102. The enterprise networks 104 include an enterprise CRM 106-1 to an enterprise CRM 106-n (collectively, the enterprise CRMs 106), a network device onboarding datastore 108-1 to a network device onboarding datastore 108-n (collectively, the network device onboarding datastores 108) coupled to the enterprise CRMs 106, a network device with an integrated mounting device 110-1-1 to a network device with an integrated mounting device 110-1-n (collectively, the network devices 110-1) coupled to the enterprise CRM 106-1, a network device with an integrated mounting device 110-n-1 to a network device with an integrated mounting device 110-n-n (collectively, the network devices 110-n) coupled to the enterprise CRM 106-n (the network devices 110-1 to 110-n can be referred to collectively as the network devices 110), stations 112 coupled to the network devices 110, and an enterprise gateway 114-1 to an enterprise gateway 114-n (collectively, the enterprise gateways 114) coupled to the enterprise CRMs 106.

The CRM 102 may comprise a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to execute, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The enterprise networks 104 are intended to represent private networks on the CRM 102, which is intended to represent a WAN. The enterprise CRM 106 is intended to represent a CRM that is under the control of an enterprise.

The onboarding datastores 108 are intended to represent datastores of onboarding parameters used to onboard network devices onto the enterprise networks 104. The onboarding datastores 108 can include configuration data for provisioning onto onboarded APs and data regarding onboarding received from the onboarded APs. Additional data may be received from or provided to a network management engine.

The network devices 110 are intended to represent routers, switches, access points, gateways, including wireless gateways, repeaters, or any combinations thereof. In functioning as gateways, network devices can transport data from a backend of a network to a device coupled to the network devices. In functioning as access points, network devices can couple a device coupled to the network devices to a network associated with the network devices. In a specific implementation, at least one of the network devices 110 is a wireless access point (WAP). In an 802.11-compliant implementation, a WAP is a networking hardware device that allows a wireless device to connect to a backbone network in compliance with the IEEE 802.11 standard. IEEE 802.11a-1999, IEEE 802.11b-1999, IEEE 802.11g-2003, IEEE 802.11-2007, and IEEE 802.11n TGn Draft 8.0 (2009) are incorporated by reference. In alternative embodiments, one or more of the network devices 110 may comply with a different standard other than IEEE 802.11, such as Bluetooth and ZigBee.

IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference. Wi-Fi is a non-technical description that is generally correlated with the IEEE 802.11 standards, as well as Wi-Fi Protected Access (WPA) and WPA2 security standards, and the Extensible Authentication Protocol (EAP) standard.

The network devices 110 have an integrated mounting device for installation of the network devices. In a specific implementation, the mounting device is embedded in the network device. Currently there are eight standard ceiling rail types used worldwide, and in an embodiment the mounting devices are configured to be compatible with one or more of the eight standard ceiling rail types. In another embodiment, the mounting devices are configured to be compatible with non-standard ceiling rail types.

Advantageously, the present invention allows for rapid installation of network devices because compatible, self-contained mounting devices can be selected for any geographic location or building architecture. In an embodiment, no drilling is required and ceiling rails are visible, so installation can be performed efficiently and in a completely non-destructive manner using the twist-to-lock method described herein.

Further, labor costs for installing network devices using existing methods are typically higher than the cost of the network devices themselves. The mounting devices described herein reduce labor costs below network device costs because installation of network devices can be performed quickly by individuals without any particular mechanical or technical skill or training.

In addition, about 20-30% of network devices are not initially mounted in an optimal location or orientation. This problem can be addressed with a site survey and trivial installation requirements appropriately addressing power over Ethernet (PoE) and backhaul operational parameters. The network devices can then be efficiently repositioned for optimal performance using the mounting devices described herein.

The network devices 110, and in particular the integrated mounting devices of the network devices 110, are described in more detail later.

The stations 112 are intended to represent wireless devices. In a specific implementation, a wireless device is a thin client device or an ultra-thin client device that includes a wireless network interface, through which the wireless device can receive data wirelessly through a wireless communication channel. The wireless network interface can be used to send data generated by the wireless device to remote or local systems, servers, engines, or datastores through a wireless communication channel. In a specific example, the wireless communication channel is a cellular communication channel. In an 802.11-compatible or 802.11-compliant implementation, a wireless device is 802.11 standards-compatible or 802.11 standards-compliant. As used in this paper, a system or device that is 802.11 standards-compatible or 802.11 standards-compliant complies with at least some of one or more of the incorporated documents' requirements and/or recommendations, or requirements and/or recommendations from earlier drafts of the documents and includes Wi-Fi systems. The stations 112 can be referred to as "on" a wireless network of an enterprise network but may or may not be the property of the enterprise. For example, the stations 112 could include privately owned devices that access services through a guest or other network of an enterprise network, or IoT devices owned by the enterprise that are on a wireless network of the enterprise.

The enterprise gateways 114 are intended to represent devices for coupling the enterprise CRMs 106 to the CRM 102.

The network management engine 116 is intended to represent an engine used by a human or artificial agent of an enterprise network to manage one or more of the enterprise networks 104.

FIG. 2A and FIG. 2B illustrate attachment of an integrated mounting device to a ceiling rail. As described above, the integrated mounting devices herein are configured to attach to one or more types of ceiling rails, and the integrated mounting device and ceiling rail shown in the figures are intended to be non-limiting examples. Mounting device 202 has operationally coupled thereto a first clip 204a and a second clip 204b, first clip 204a having a first spring 206a, a first upper rail-engaging surface 208a and a first inner rail-engaging surface 210a, and second clip 204b having a second spring 206b, a second upper rail-engaging surface 208b and a second inner rail-engaging surface 210b. First clip 204a and second clip 204b are configured to attach mounting device 202 to a ceiling rail 212 by engaging first inner rail-engaging surface 210a and second inner rail-engaging surface 210b to a first edge of ceiling rail 212 and a second edge of ceiling rail 212, respectively. In FIG. 2B, mounting device 202 is rotated while first and second upper rail-engaging surfaces 208a and 208b engage ceiling rail 212. The engaging of ceiling rail 212 by first and second upper rail-engaging surfaces 208a and 208b causes first spring 206a to store first mechanical energy and second spring 206b to store second mechanical energy until first inner rail-engaging surface 210a passes beyond the first edge of ceiling rail 212 and second inner rail-engaging surface 210b passes beyond the second edge of ceiling rail 212. The first edge and the second edge are on different sides of ceiling rail 212, and thus releasing the first stored mechanical energy causes first inner rail-engaging surface 210a to engage ceiling rail 212 at the first edge and releasing the second stored mechanical energy causes second inner rail-engaging surface 210b to engage ceiling rail 212 at the second edge. In this embodiment, the attachment of mounting device 202 to ceiling rail 212 is completely non-destructive and can be performed without requiring the use of any tools.

In an embodiment, ceiling rail 212 is located above a suspended tile grid, which is commonly referred to as a drop ceiling or a suspended ceiling. Suspended tile grids are typically used in industrial and commercial settings, and the tiles are designed to be easily removed to allow access to elements above the tile grid, such as plumbing and HVAC components. As such, attaching the mounting devices described herein to ceiling rails above a suspended tile grid can be performed in a non-destructive manner by removing one or more tiles of the grid.

In an embodiment, the mounting devices described herein are configured to be attached to a wall using one or more screws. It may be desirable to mount a network device on a wall for earthquake-proofing, or if it is determined that the wall is the optimal position for the network device. In an embodiment, destruction to the wall can be minimized by attaching the mounting devices to raised wall mounts, which are common in industrial and commercial settings due to the use of expansion joints to support centralized air conditioning systems.

Figure 3A:
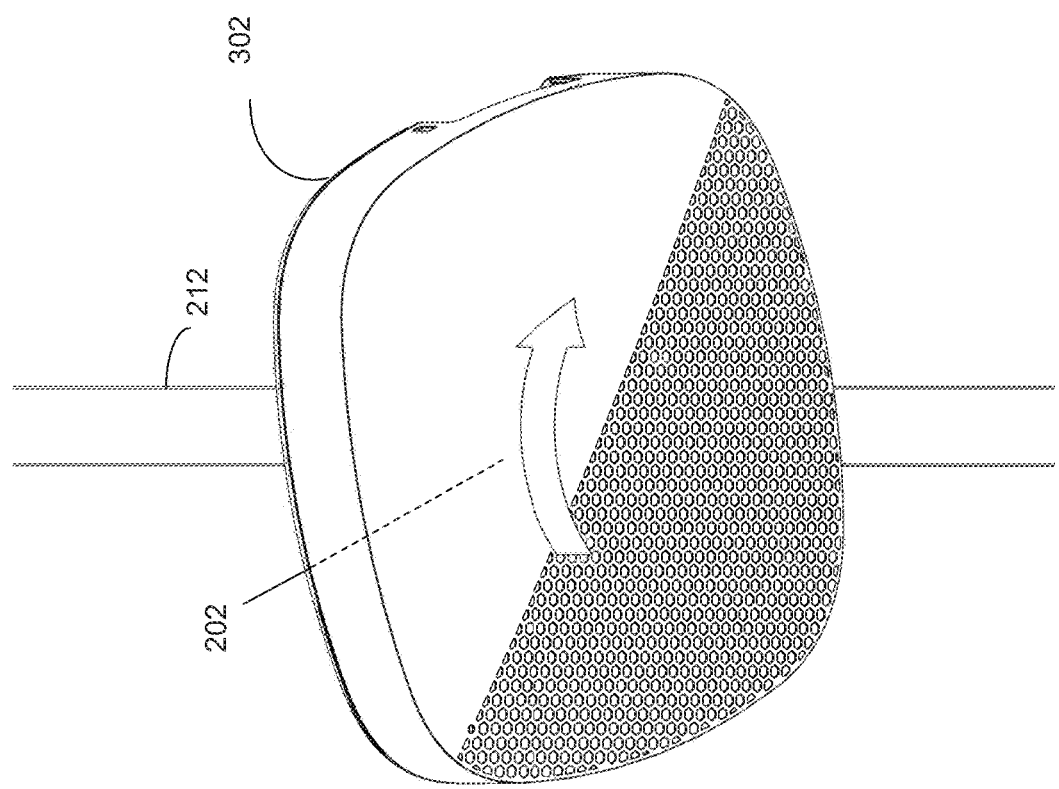
FIG. 3A and FIG. 3B illustrate attachment of a network device to an integrated mounting device in an embodiment.
Figure 3B:
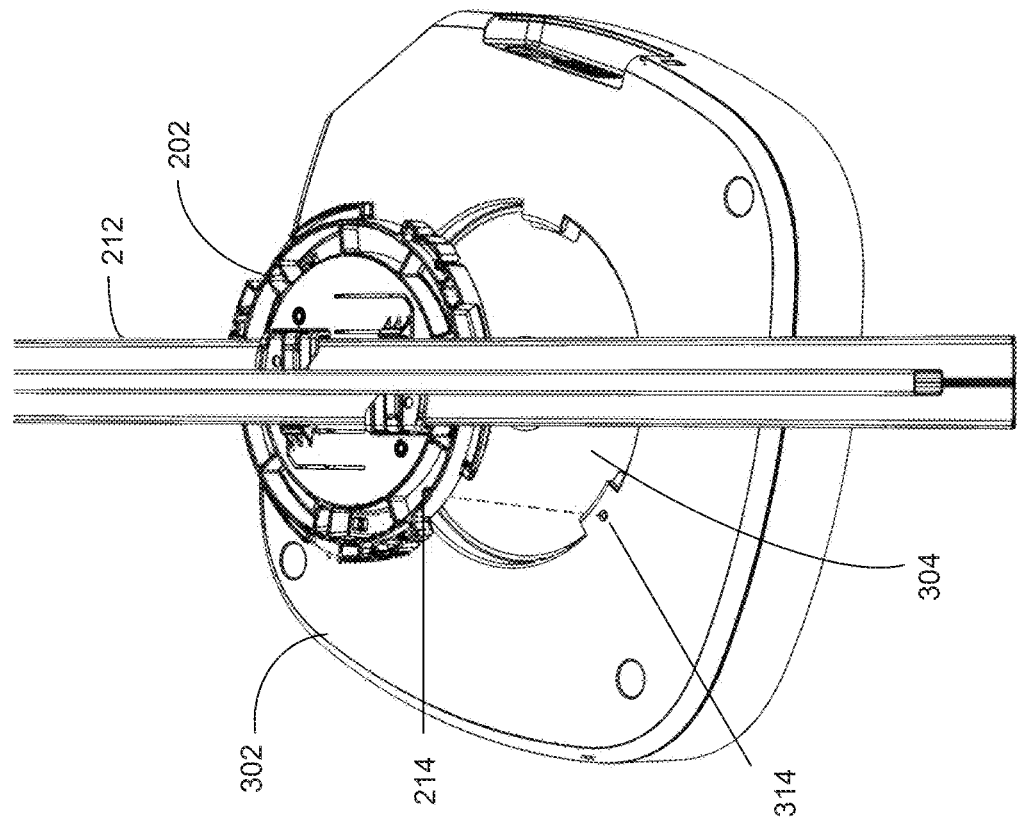

FIG. 3A and FIG. 3B illustrate attachment of a network device to an integrated mounting device. Network device 302 and mounting device 202 are configured to be integrated with one another such that mounting device 202 can be embedded within network device 302. Network device 302 includes a recessed area 304 that is configured to embed mounting device 202 therein. In FIG. 3A, network device 302 is aligned with mounting device 202 to facilitate embedding mounting device 202 within recessed area 304. In an embodiment, network device 302 and mounting device 202 include aligning features 314 and 214, respectively, to facilitate precise alignment of network device 302 with mounting device 202. In an embodiment, aligning features 314 and 214 comprise a visible mark. After network device 302 and mounting device 202 have been properly aligned, network device 302 is brought into contact with mounting device 202 such that the sides of recessed area 304 surround mounting device 202. In FIG. 3B, network device 302 is rotated until it locks in position, thus embedding mounting device 202 therein and effectively mounting network device 302 to ceiling rail 212.

In an embodiment, mounting device 202 is first attached to (i.e., embedded in) network device 302. Mounting device 202 is then attached to ceiling rail 212 in the manner described with reference to FIG. 2.

FIG. 4A and FIG. 4B illustrate removal of a network device from an integrated mounting device. Network device 302 is pushed upward and rotated until network device 302 disengages from mounting device 202 (i.e., until mounting device 202 is no longer embedded in network device 302). Network device 302 can then be removed from contact with mounting device 202, effectively disengaging network device 302 from ceiling rail 212.

Figure 5:
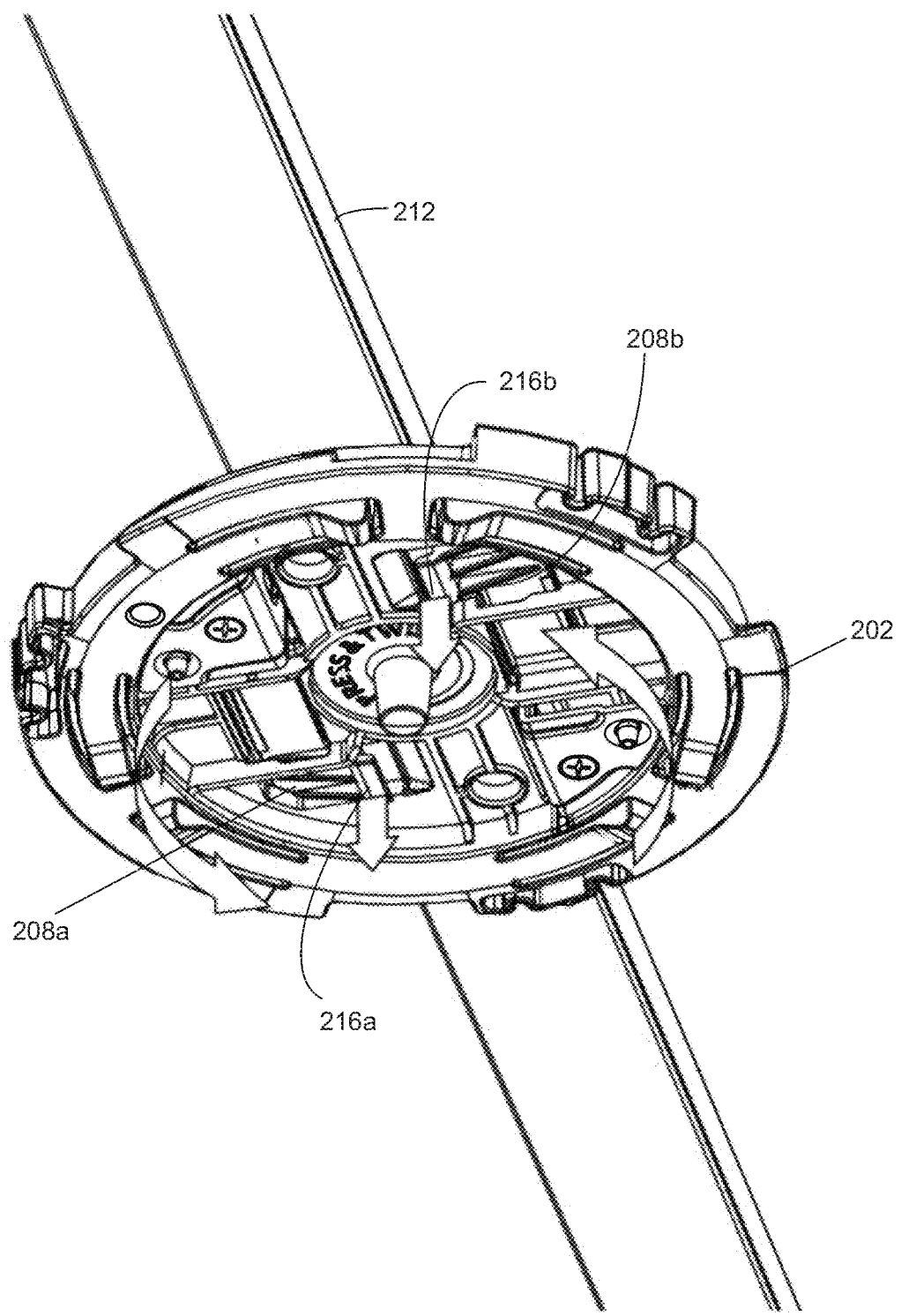
FIG. 5 illustrates removal of an integrated mounting device from a ceiling rail in an embodiment.

FIG. 5 illustrates removal of a mounting device from a ceiling rail. In an embodiment, mounting device 202 includes a first clip release device 216a operationally connected to first clip 204a and a second clip release device 216b operationally connected to second clip 204b. Activation of first clip release device 216a stores third mechanical energy in first spring 206a causing first inner rail-engaging surface 210a to disengage from the first edge of ceiling rail 212, and activation of second clip release device 216b stores fourth mechanical energy in second spring 206b causing second inner rail-engaging surface 210b to disengage from the second edge of ceiling rail 212. Mounting device 202 can then be removed from contact with ceiling rail 212.

In an embodiment, mounting device 202 includes an open area adjacent first clip 204a and an open area adjacent second clip 204b, allowing first and second clips 204a and 204b to be released by inserting a finger into the open areas and pulling first and second clips 204a and 204b downward.

The examples provided herein are intended to illustrate, but not necessarily to limit, the described invention. As used herein, the terms "implementation" and "embodiment" mean an implementation or embodiment that serves to illustrate by way of example but not limitation.

The invention claimed is:

1. A device, comprising:
a network device comprising a recessed area disposed on a top side of the network device; and
a mounting device embedded within the recessed area of the network device, the mounting device comprising:
a first clip comprising a first spring, a first upper rail-engaging surface, and a first inner rail-engaging surface; and
a second clip comprising a second spring, a second upper rail-engaging surface, and a second inner rail-engaging surface;
wherein the first clip and the second clip are configured to attach the mounting device to a ceiling rail by engaging the first inner rail-engaging surface and the second inner rail-engaging surface to a first edge of the ceiling rail and a second edge of the ceiling rail, respectively.

2. The device of claim 1, wherein the attaching the mounting device comprises:
rotating the mounting device while the first and second upper rail-engaging surfaces engage the ceiling rail causing the first spring to store first mechanical energy and the second spring to store second mechanical energy until the first inner rail-engaging surface passes beyond the first edge of the ceiling rail and the second inner rail-engaging surface passes beyond the second edge of the ceiling rail, wherein the first edge and the second edge are on different sides of the ceiling rail, thereby releasing the first stored mechanical energy to cause the first inner rail-engaging surface to engage the ceiling rail at the first edge and releasing the second stored mechanical energy to cause the second inner rail-engaging surface to engage the ceiling rail at the second edge.

3. The device of claim 1, comprising an aligning feature disposed on the mounting device, the aligning feature facilitating aligning the network device with the mounting device.

4. The device of claim 3, wherein the aligning feature comprises a visible mark.

5. The device of claim 1, wherein the first clip and the second clip are removable.

6. The device of claim 1, wherein the mounting device is configured to be attached to a wall using one or more screws.

7. The device of claim 1, comprising a first clip release device operationally connected to the first clip and a second clip release device operationally connected to the second clip, wherein activation of the first clip release device stores third mechanical energy in the first spring causing the first inner rail-engaging surface to disengage from the first edge of the ceiling rail, and activation of the second clip release device stores fourth mechanical energy in the second spring causing the second inner rail-engaging surface to disengage from the second edge of the ceiling rail.

8. The device of claim 1, wherein the mounting device comprises an open area adjacent to the first clip and another open area adjacent to the second clip.

9. A network device, comprising:
a top side and a bottom side;
a recessed area disposed on the top side of the network device, the recessed area configured to embed a mounting device therein; and an aligning feature disposed on the top side of the network device and configured to align the network device with the mounting device.

10. The network device of claim 9, wherein the aligning feature comprises a visible mark.

11. The network device of claim 9, wherein the mounting device includes two removable clips.

12. The network device of claim 9, wherein the mounting device is configured to be attached to a wall using one or more screws.

13. A method of mounting a network device, the method comprising:
   attaching a mounting device to a rail, the mounting device configured to be integrated with a network device and comprising a plurality of clips disposed on a top side of the mounting device, wherein the plurality of clips are configured to attach the mounting device to the rail;
   attaching the network device to the mounting device, the network device comprising a recessed area disposed on a top side of the network device; and
   embedding the mounting device in the recessed area.

14. The method of claim 13 comprising: aligning the network device with the mounting device.

15. The method of claim 13 comprising: bringing the network device into contact with the mounting device.

16. The method of claim 13 comprising: twisting the network device until the mounting device is locked into position therein.

17. The method of claim 13, wherein the mounting device further comprises a first aligning feature disposed on a bottom side thereof and the network device further comprises a second aligning feature disposed on the top side thereof, the first and second aligning features facilitating aligning the network device with the mounting device.

18. The method of claim 17, wherein the first aligning feature includes a visible mark.

19. The method of claim 17, wherein the second aligning feature includes a visible mark.

20. The method of claim 13, wherein the mounting device has an alternative configuration for attaching the mounting device to a wall using one or more screws.

* * * * *